(12) United States Patent
Norasak et al.

(10) Patent No.: US 9,174,409 B2
(45) Date of Patent: Nov. 3, 2015

(54) SCORED MEDIA SUBSTRATE AND CURLING REMEDY FOR MICRO-FLUID APPLICATIONS

(75) Inventors: Sam Norasak, Lexington, KY (US); Colin Geoffrey Maher, Georgetown, KY (US)

(73) Assignee: Funai Electric Co., Ltd. (JP)

( * ) Notice: Subject to any disclaimer, the term of this patent is extended or adjusted under 35 U.S.C. 154(b) by 621 days.

(21) Appl. No.: 13/457,640

(22) Filed: Apr. 27, 2012

(65) Prior Publication Data

US 2013/0288005 A1 Oct. 31, 2013

(51) Int. Cl.
*B32B 3/28* (2006.01)
*B32B 3/30* (2006.01)
*B32B 3/02* (2006.01)

(52) U.S. Cl.
CPC ............ *B32B 3/02* (2013.01); *Y10T 428/24471* (2015.01)

(58) Field of Classification Search
CPC .......... B32B 3/00; B32B 3/30; B32B 38/145; B32B 2309/10; B32B 2309/105; B32B 38/0004; B32B 29/00; B32B 27/10; B32B 2425/00; B32B 2317/12; B32B 2038/045; B65D 5/4266; B31F 1/08; B26D 3/06; B26D 3/08

USPC ................ 428/43, 156, 167, 141, 155, 211.1
See application file for complete search history.

(56) References Cited

U.S. PATENT DOCUMENTS

| | | | |
|---|---|---|---|
| 3,961,547 A | | 6/1976 | Shainberg |
| 4,883,451 A | | 11/1989 | Hoy |
| 4,936,818 A | | 6/1990 | Holohan |
| 5,035,037 A | | 7/1991 | Sprung |
| 5,275,868 A | * | 1/1994 | Popat et al. ................ 428/195.1 |
| 5,764,263 A | | 6/1998 | Lin |
| 5,997,623 A | | 12/1999 | Lin |
| 6,038,789 A | | 3/2000 | Kaihovirta |
| 6,390,617 B1 | * | 5/2002 | Iwao ............................. 347/102 |
| 6,416,176 B1 | * | 7/2002 | Yasui et al. .................. 347/104 |
| 7,377,996 B2 | * | 5/2008 | Bilodeau ...................... 162/136 |
| 7,553,591 B2 | | 6/2009 | Wu |
| 7,670,275 B2 | | 3/2010 | Schaack |
| 7,753,833 B2 | | 7/2010 | Crick |
| RE42,888 E | | 11/2011 | Crick |

* cited by examiner

*Primary Examiner* — Catherine A Simone
(74) *Attorney, Agent, or Firm* — Amster, Rothstein & Ebenstein LLP

(57) ABSTRACT

A media substrate for imaging includes a front and back surface defining a thickness. The front receives imaging fluid and absorbs it. The back has scoring lines extending into the thickness that limit curling of the media substrate as the absorbed fluid dries on the front. Patterns and locations of scoring lines as well as their depth into the thickness are noted. Imaging and scoring stations in an imaging device are still other embodiments as are cutting features for scoring.

8 Claims, 9 Drawing Sheets

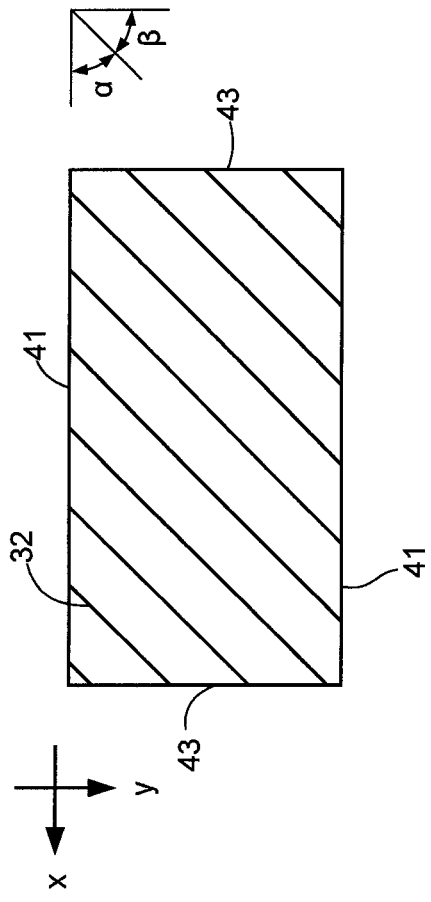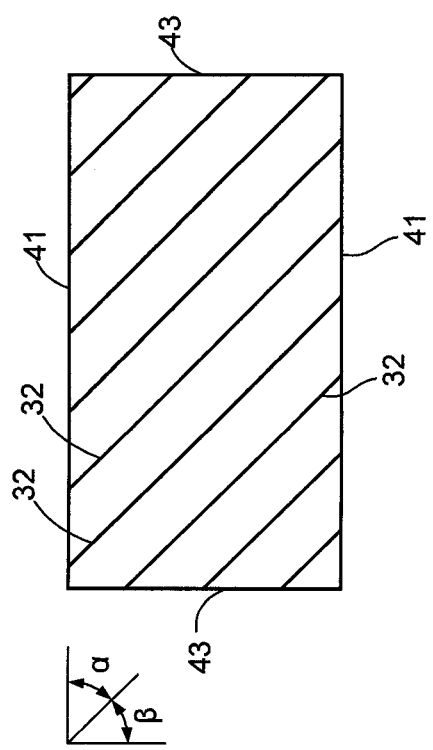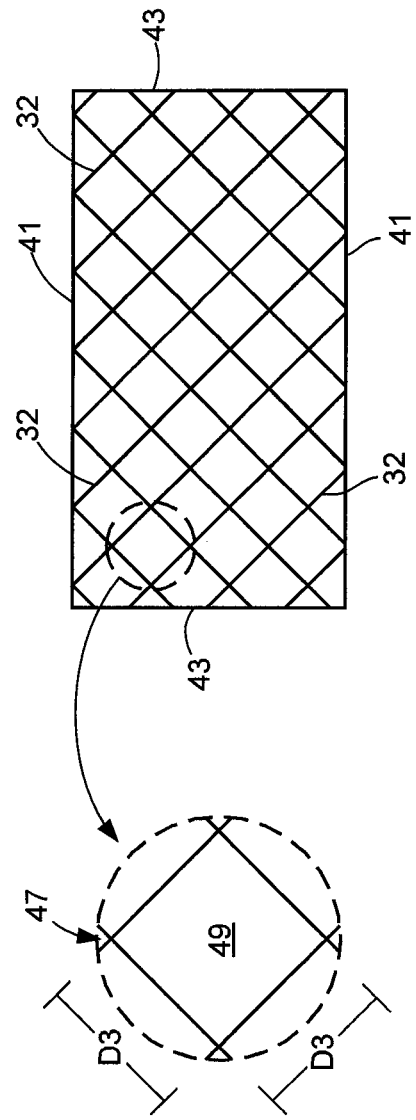
Fig. 3A
Fig. 3B
Fig. 3C

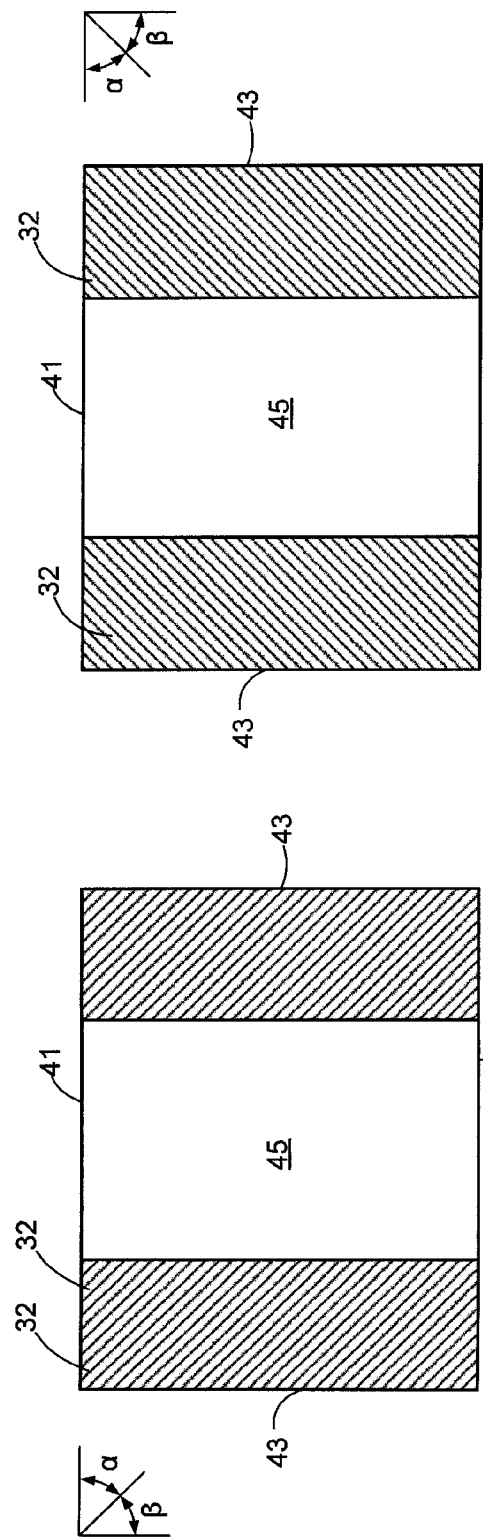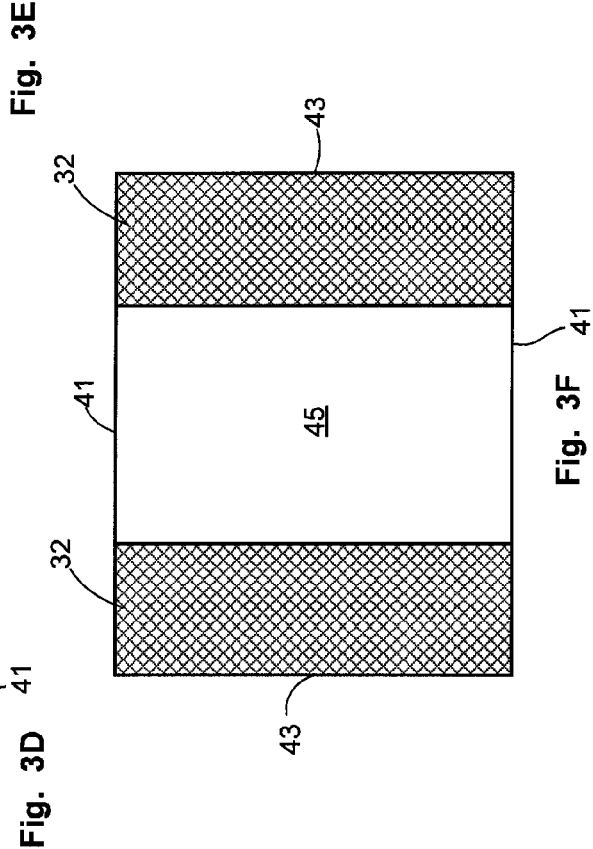
Fig. 3D
Fig. 3E
Fig. 3F

SCORED MEDIA SUBSTRATE AND CURLING REMEDY FOR MICRO-FLUID APPLICATIONS

FIELD OF THE INVENTION

The present invention relates to micro-fluid applications, such as inkjet printing. It relates particularly to media substrates having scoring to prevent curling.

BACKGROUND OF THE INVENTION

The art of printing with micro-fluid technology is relatively well known. A permanent or semi-permanent ejection head has access to local or remote supplies of fluid (e.g., ink). The fluid ejects from an ejection zone to a print media in a pattern of pixels corresponding to images being printed. Fluid absorbed in the media dries. It is known to cause curling.

In simple terms, curling is a distortion in which the edges or corners of the media roll or migrate toward the printed side of the media and away from the non-printed side. It results in a tube or scroll shape that prevents convenient stacking of multiple sheets. It also makes difficult the reading or displaying of images on the sheets. It can also make it difficult to print precisely, if the curling begins during printing; changing the print gap before printing is complete.

Remedies to prevent curling are plentiful in the art. They include double-sided printing, steaming, and hot plates to iron curls. Other remedies include formulating anti-curling inks. All, however, add complexity and/or expense to imaging devices and ink formulas.

A need exists to more simply prevent curling. The need extends not only to keeping simple the imaging device and its ink, but to inexpensively and quickly minimizing curling during the imaging process. Additional benefits and alternatives are also sought when devising solutions.

SUMMARY

The above-mentioned and other problems become solved with scored media substrates and curling remedies for micro-fluid applications. A media substrate for imaging includes a front and back surface defining a thickness. The front receives imaging fluid and absorbs it. The back has scoring lines extending into the thickness that limit curling of the media substrate as the absorbed fluid dries on the front. The scoring relaxes the fibers of the media on its backside. It compromises fiber strength and minimizes a tendency of the media to curl. Patterns and locations of scoring lines as well as their depth into the thickness of the media are noted.

Imaging and scoring stations in imaging devices are still other embodiments as are cutting features for scoring. In a representative design, media substrates are fed (directly or by conveyor) to a media nip. The nip includes a roller contacting the front of the media and a roller with cutting blades contacting the back of the media. The blades are angled along a length of the roller. As the media advances, the rollers turn at the nip and the blades score the back of the media. Rollers can be replaced as they wear or can be interchanged with sleeve tubes having blades of various size and orientation depending upon application. The blades can typify star wheels, serrated teeth, needle pins, lengthy metal edges, or other. Alternatively, scoring can occur in stationary environments without rolling and with dedicated blades pressed directly into the media.

These and other embodiments will be set forth in the description below. Their advantages and features will become readily apparent to skilled artisans. The claims set forth particular limitations.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 3A-3G are planar views of media substrates showing lines of scoring;

DETAILED DESCRIPTION OF THE ILLUSTRATED EMBODIMENTS

In the following detailed description reference is made to the accompanying drawings where like numerals represent like details. The embodiments are described in sufficient detail to enable those skilled in the art to practice the invention. It is to be understood that other embodiments may be utilized and that process, electrical, and mechanical changes, etc., may be made without departing from the scope of the invention. The following detailed description, therefore, is not to be taken in a limiting sense and the scope of the invention is defined only by the appended claims and their equivalents. In accordance with the present invention, methods and apparatus teach scored media substrates and curling remedies for micro-fluid applications, such as inkjet printing.

Figure 1:
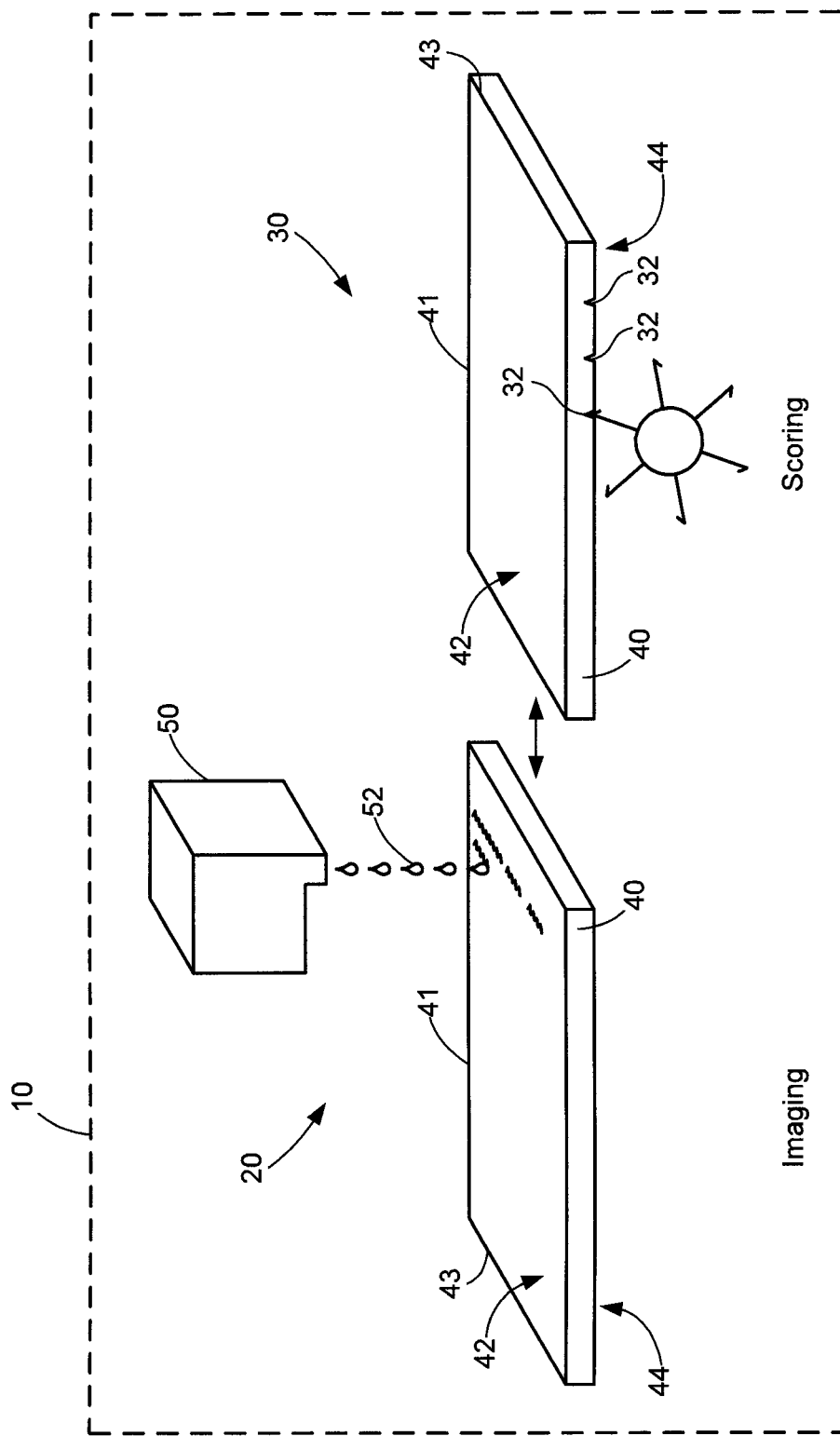
FIG. 1 is a diagrammatic view in accordance with the teachings of the present invention of an imaging device sporting imaging and scoring stations to remedy curling in micro-fluid applications.

With reference to FIG. 1, an imaging device 10 (e.g., inkjet printer) includes an imaging station 20 and a scoring station 30. A media substrate 40 advances from one station to the next. Upon imaging, an ejection head 50 ejects fluid 52 (e.g., ink) onto a first (front) surface 42 of the media. It is absorbed into a thickness. Upon scoring, a plurality of score lines 32 are cut into the opposite (back) surface 44 of the media to reduce curling of the media substrate as the absorbed fluid on the front surface dries.

Figure 8:
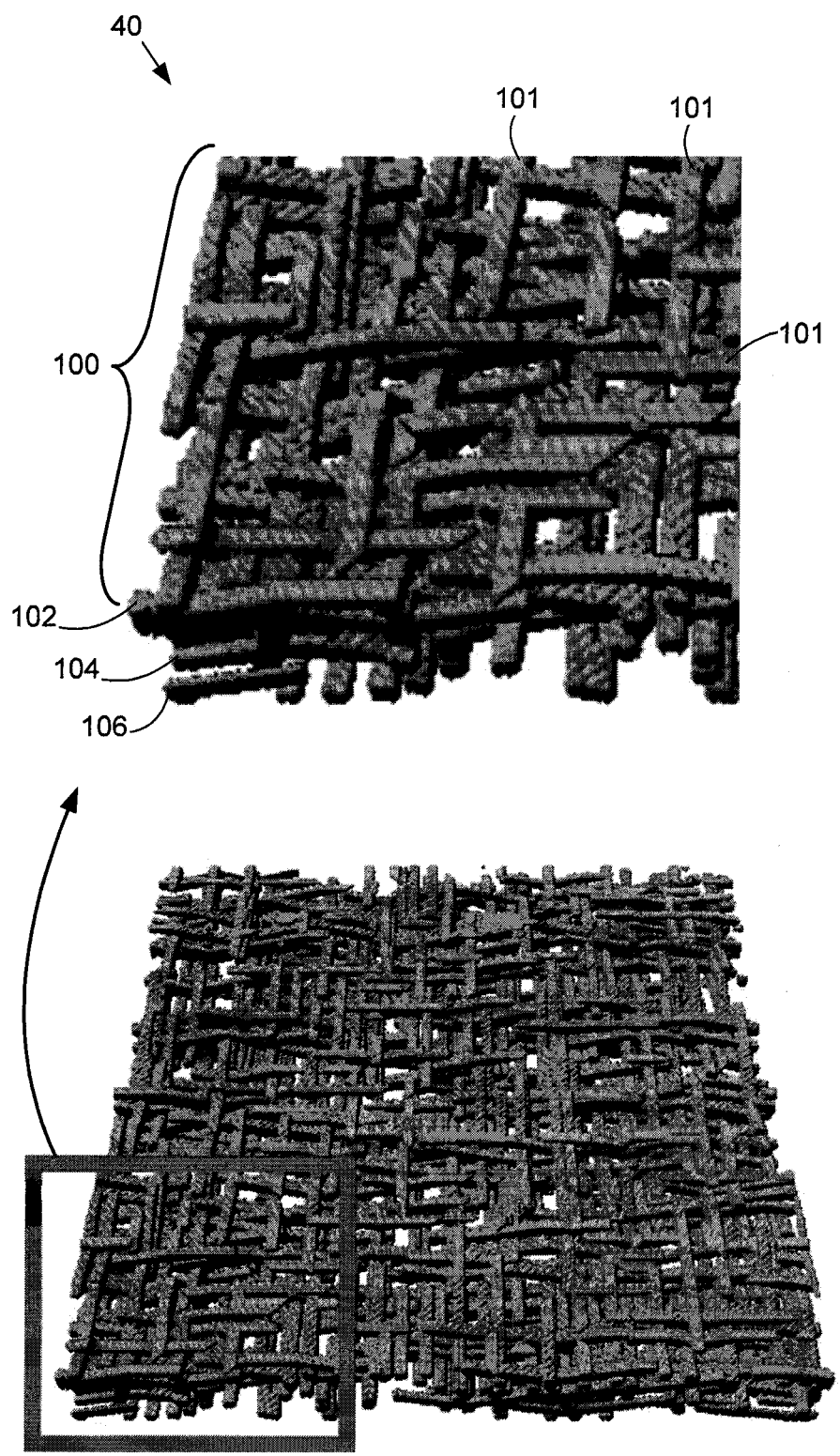
FIG. 8 is a diagrammatic view of the prior art thatchwork of wood fibers constituting a paper substrate.

As is known, media substrates in the form of paper 40' (FIG. 8) consist of a thatchwork 100 of wood fibers 101 that weave in and out of one another, mostly in multiple layers 102, 104, 106. During manufacturing, stresses are introduced into these fibers. As fluid is absorbed into but one side of the paper, it preferentially releases stresses on that side. Its subsequent drying creates a new, imbalanced stress-state causing the paper to curl. As the scoring (FIG. 1) on the back surface of the media cuts through a portion of the fibers, the fibers have a lesser ability to transmit stress across the length and width of the paper and the paper has a lesser tendency to curl. It overcomes the problems noted in the prior art.

Figure 2:
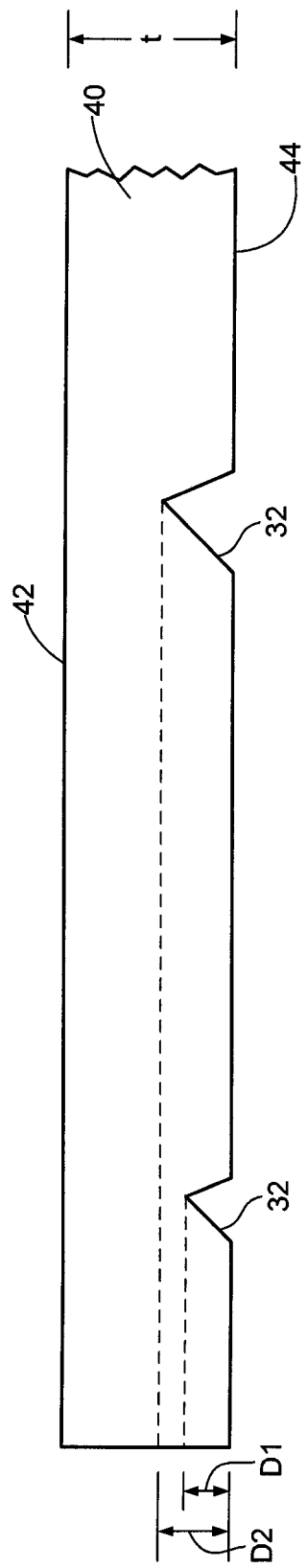
FIG. 2 is a diagrammatic view of a scored media substrate in partial cross section.

With reference to FIG. 2, a media substrate 40 has a thickness t defined between the front and back surfaces 42, 44. Score lines 32 cut into the media substrate from the back surface extend into the thickness of the media. In certain embodiments, the thickness of the media ranges from about 90 to about 120 micrometers. In turn, a depth D1 of score lines can be at least 10% of the thickness of the media substrate. In still other embodiments, a depth D2 of a score line is limited to less than 50% of the thickness. In preferred instances, an optimal depth of the score lines ranges from about 10% to about 35% of the thickness. Specific testing of score lines into the thickness of the media has ranged the cuts from as little as 12.05 micrometers to about 68.93 micrometers. More optimally, cuts have been as little as 18.28 micrometers to as much as 33.83 micrometers. All were cut into media substrates ranging from 90-120 micrometers.

Figure 3G:
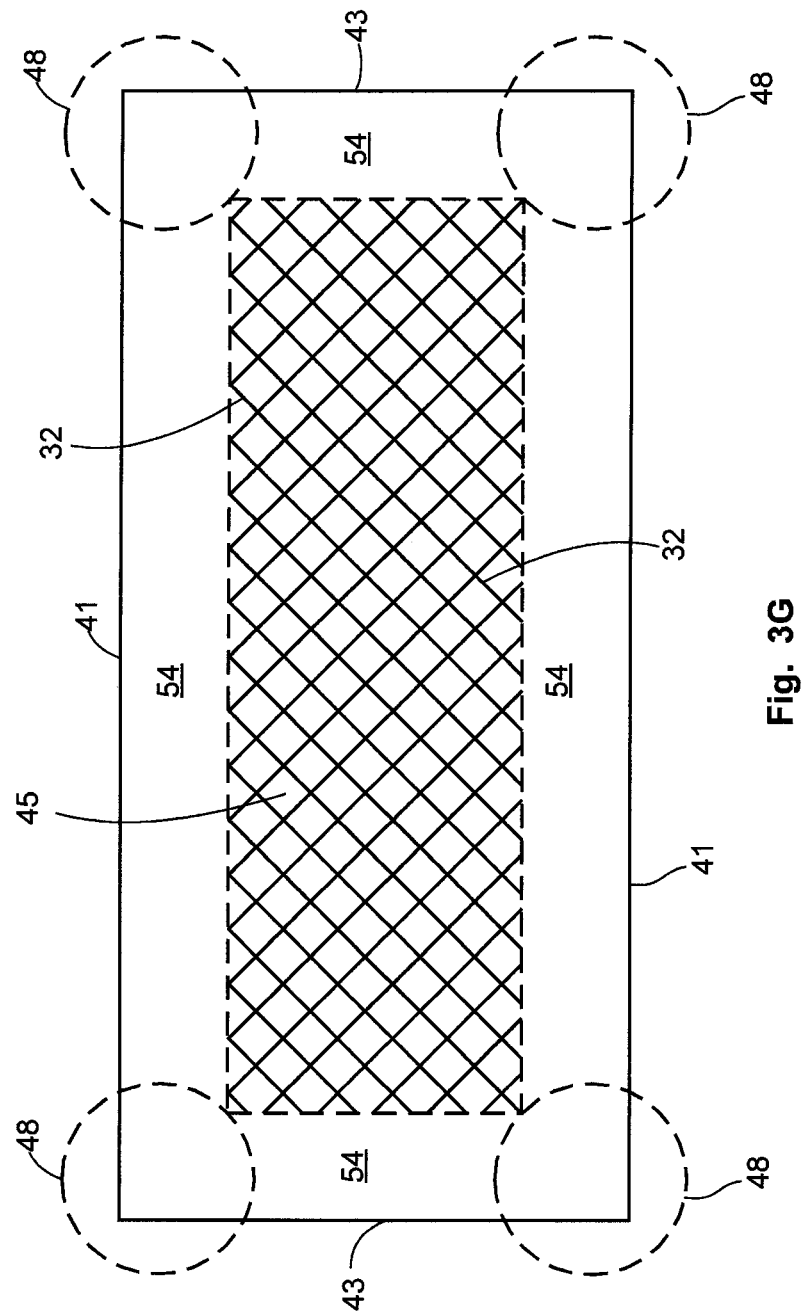

With reference to FIGS. 3A-3G, score lines are arranged variously on media substrates. Each substrate has a planar surface defined generally by a rectangular shape with two long 41 and two short 43 peripheral edges configured in an x-y orientation. In a first embodiment, FIG. 3A, pluralities of lines 32 are scored into the media at an angle ($\alpha$, $\beta$) relative to the x-y orientation. The angle $\alpha$ is in a range from about 30 to about 60 degrees. Conversely, the angle $\beta$ is in an opposite range from about 60 to about 30 degrees. In a preferred instance, both angles are equal to one another and $\alpha=\beta=45$ degrees. In a second embodiment, FIG. 3B, the scoring angles ($\alpha$, $\beta$) remain the same as noted, but the orientation changes of the lines across the back surface of the substrate. They change from left-to-right downward slants (as viewed in FIG. 3A) to left-to-right upward slants (as viewed in FIG. 3B). As seen in FIG. 3C, combining together the scoring of both FIGS. 3A and 3B results in score lines 32 that intersect 47 one another across the back surface of the media and form substantially square shapes 49 having no instances of scoring. Distances D3 are also noted as ranging from about 0.25 to about 2 inches.

With reference to FIGS. 3D-3F, they are views similar to FIGS. 3A-3C, respectively, but the back surface of the media defines a central interior region 45 and the score lines 32 do not extend therein. In this way, curling and paper fiber strength is minimized in only the corner regions of the paper where curling originates, but paper fiber strength is otherwise left intact in the central interior region. With reference to FIG. 3G, the opposite notion is noted. The central interior region 45 is scored on the back surface of the media, but the score lines 32 do not extend into corner regions 48 or other peripheral regions 54 of the paper. Of course, skilled artisans can devise schemes based on empirical testing to determine whether or not to score particular regions of the back surface of the media. How far and to what extent scoring occurs is still further devisable by those skilled in the art.

Figure 4:
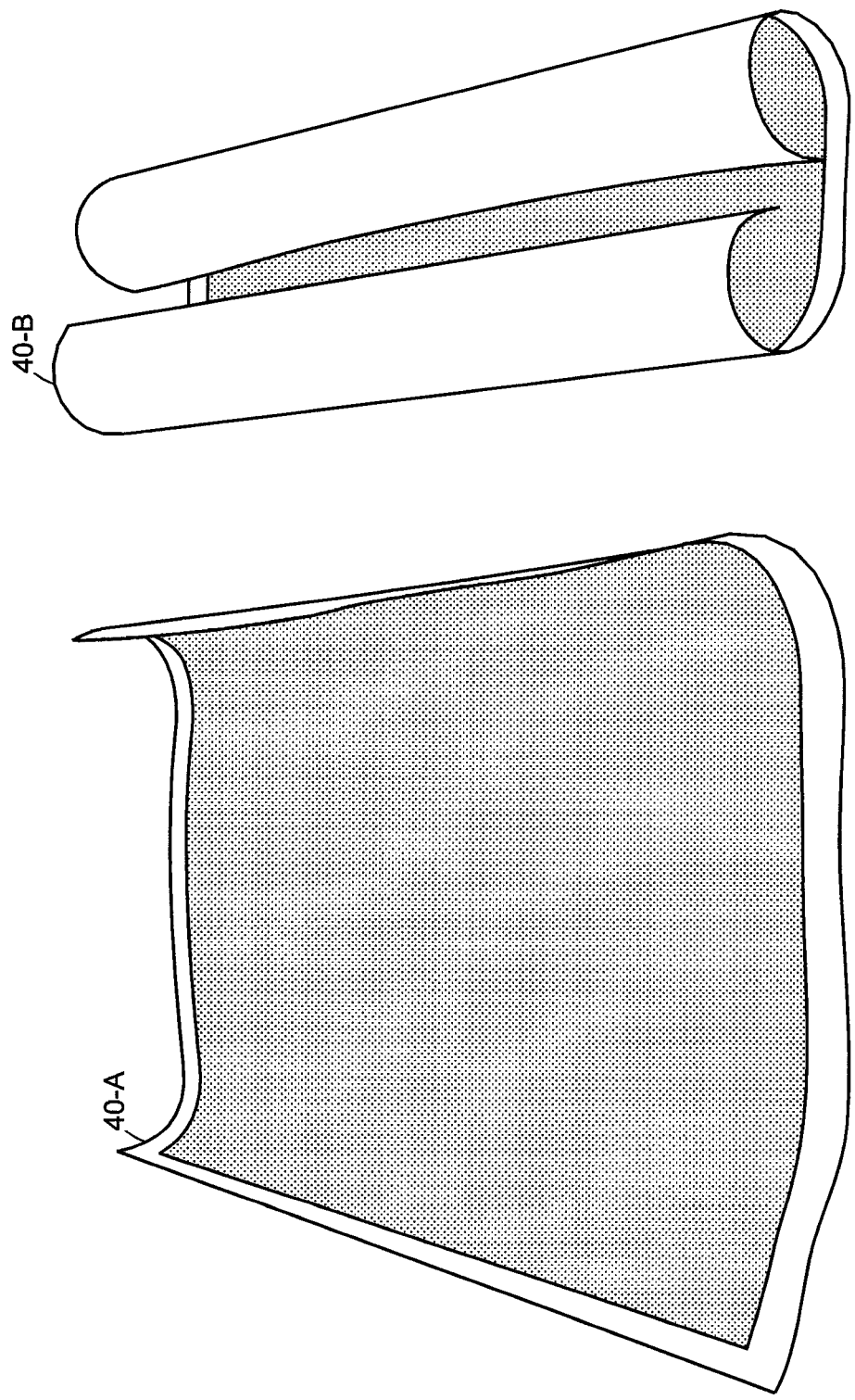
FIG. 4 is a picture (redrawn from an actual photo) of comparison test results showing scored media remedying curling.

With reference to FIG. 4, the inventors printed front surfaces of media substrates with the same images. On the back of media substrate 40-a, scoring lines were cut, whereas media substrate 40-b had no scoring. As is readily seen, the media substrate 40-b with no scoring has extensive curling, whereas the scored media substrate 40-a has minimal curling. The improved results over the prior art are dramatic.

Figure 5:
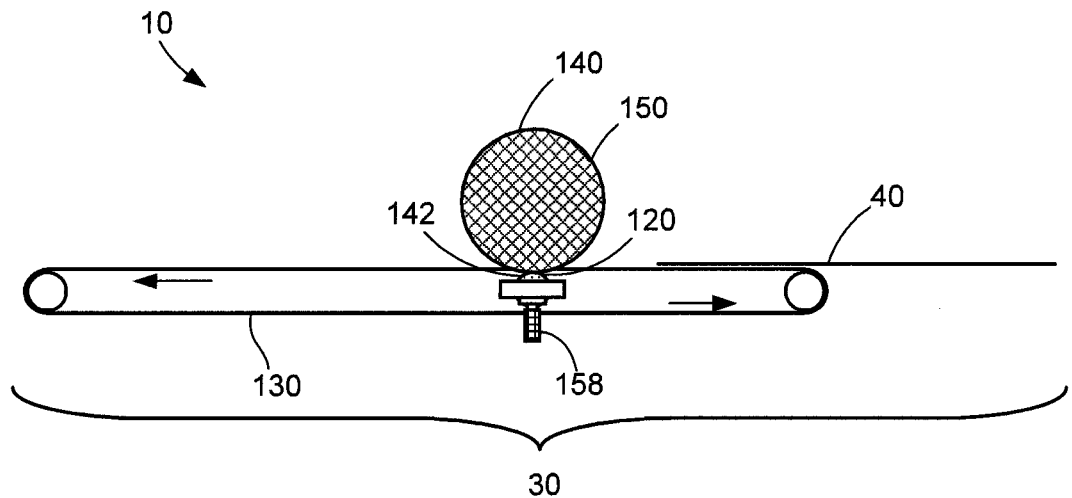
FIGS. 5 and 6 are diagrammatic views of media feeding to a nip in imaging devices for scoring.
Figure 6:
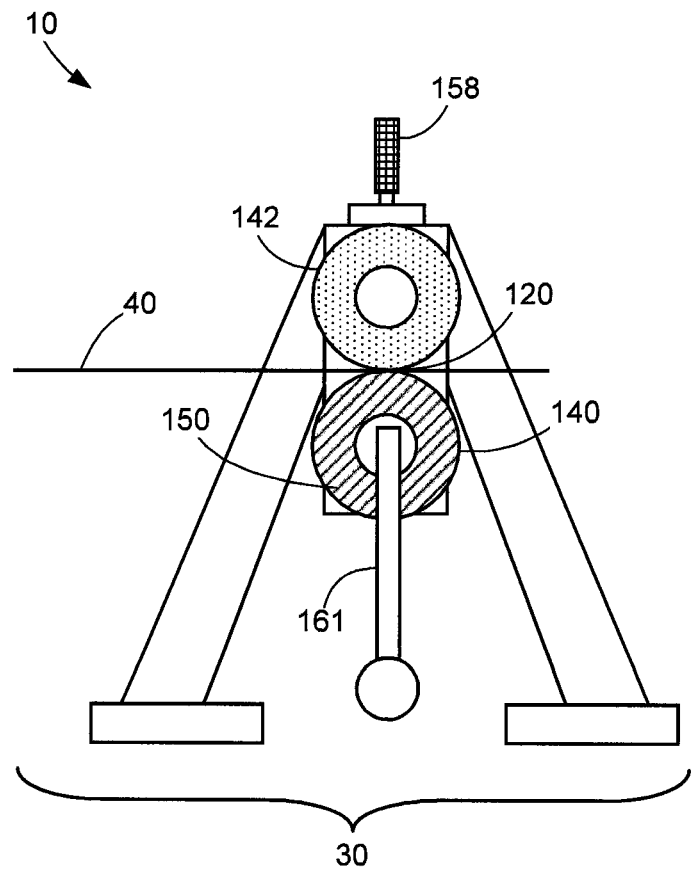

With reference to FIGS. 5 and 6, imaging devices 10 include scoring stations 30. The stations include a media nip 120. Media substrates 40 are fed to the nip 120 by way of a conveyor belt 130 or directly, such as from application of a manual crank or from an extended paper path, not shown. At the nip, two rollers 140, 142 press together to receive advancing media substrates. A first roller 142 has a relatively smooth outer surface while the second roller 140 has one or more cutting blades 150. The cutting blades score the back surface of the media as the media passes through the nip and the blades slice into a thickness of the media. The scoring is done before or after imaging at an imaging station 20 (FIG. 1). Adjuster mechanisms 158 are optionally provided to adjust the pressure of the rollers at the nip. They move the rollers closer or farther away from one another. They also are set to control the depth to which the scoring lines are cut into the thickness of the media.

Figure 7A:
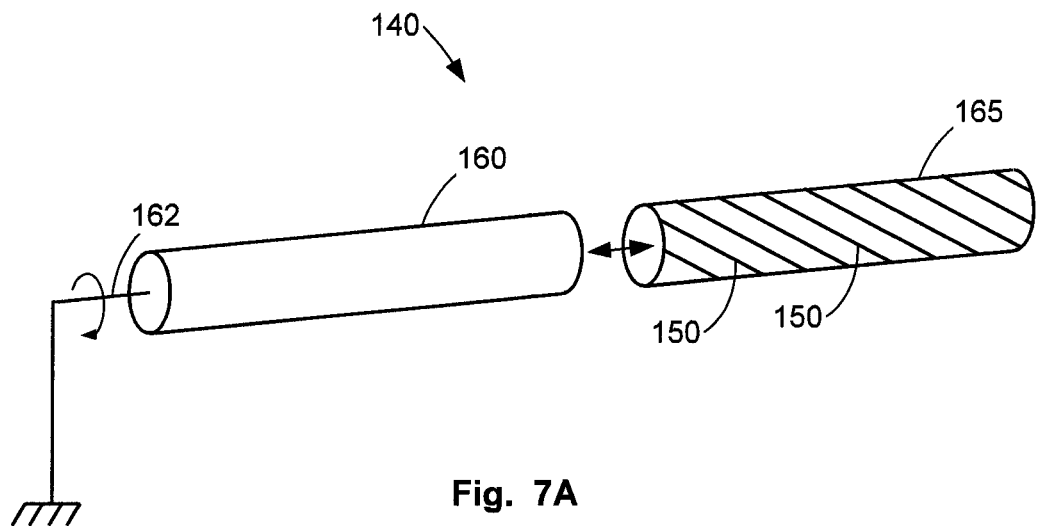
FIGS. 7A-7B are views of a replaceable sleeve tube for scoring.
Figure 7B:
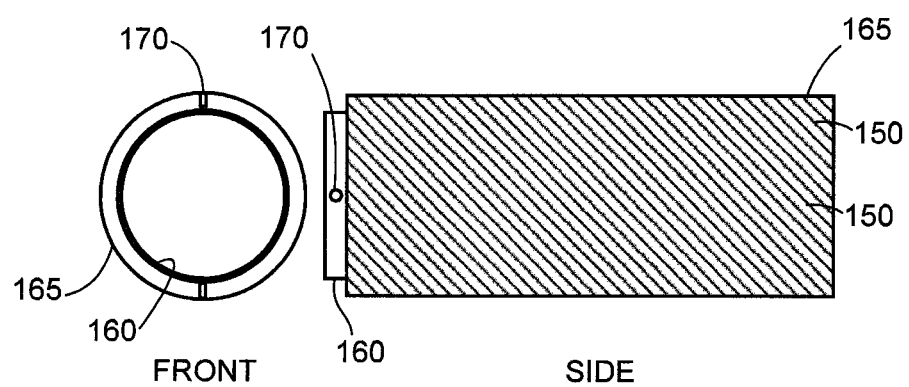

With reference to FIGS. 7A-7B, the roller 142 having cutting blades for scoring media substrates can be configured as a replaceable item. In a first instance, an under roller 160 is configured with motive force to rotate about its shaft 162. A quick release sleeve tubing 165 fits over the top of the under roller. The two are locked together to rotate as a single unit. They lock by way of a fitting, such as a screw 170. As the motive force imparts a rotation to the under roller, the sleeve tubing rotates. Its blades 150 score the media substrate. By unlocking the rollers, the sleeve tubing can be readily interchanged with other sleeve tubes having blades 150 of various size and orientation depending upon application. The sleeve tubing can be also readily swapped with worn blades. Sleeve tubes can be further fitted onto a carousel of sorts for the imaging device to automatically rotate from one scoring mechanism to the next. Other designs are also possible too.

The foregoing is presented for purposes of illustrating the various aspects of the invention. It is not intended to be exhaustive or to limit the claims. Rather, it is chosen to provide the best illustration of the principles of the invention and its practical application and to enable one of ordinary skill in the art to utilize the invention, including its various modifications that follow. All such modifications and variations are contemplated within the scope of the invention as determined by the appended claims. Relatively apparent modifications include combining one or more features of various embodiments with one or more features of other embodiments.

The invention claimed is:

1. A media substrate for imaging, comprising:
a front and back surface defining a thickness, the front surface comprising imaging fluid that is absorbed into the thickness, the front surface being devoid of score lines; and
a plurality of score lines cut on the back surface that extend between 10% and 50% into the thickness and arranged such that the back surface has lesser stress than the front surface to reduce curling of the media substrate as the absorbed imaging fluid dries.

2. The media substrate of claim 1, wherein the score lines are arranged on the back surface in a predetermined pattern.

3. The media substrate of claim 1, wherein the front and back surface define a substantially rectangular shape with two long and short peripheral edges defining a length and width of the media substrate and each of the score lines angles from the short peripheral edges in a range of about 30 to about 60 degrees.

4. The media substrate of claim 1, wherein each of the score lines intersects other score lines to form a substantially square shape on the back surface having no scoring.

5. The media substrate of claim 1, wherein the back surface defines a substantially rectangular shape and the score lines do not extend into corners of the rectangular shape.

6. The media substrate of claim 1, wherein the back surface defines a substantially rectangular shape having a central interior region and the score lines do not extend into the central interior region.

7. The media substrate of claim 1, wherein the thickness ranges from about 90 to about 120 micrometers.

8. The media substrate of claim 1, wherein a depth of the score lines ranges from about 10% to about 35% of the thickness.

* * * * *